United States Patent [19]

Poplawski et al.

[11] Patent Number: 5,717,533
[45] Date of Patent: *Feb. 10, 1998

[54] REMOVABLE OPTOELECTRONIC MODULE

[75] Inventors: Daniel S. Poplawski, Montgomery; James W. McGinley, Schaumburg, both of Ill.

[73] Assignee: Methode Electronics Inc., Chicago, Ill.

[*] Notice: The term of this patent shall not extend beyond the expiration date of Pat. No. 5,546,281.

[21] Appl. No.: 417,914

[22] Filed: Apr. 6, 1995

Related U.S. Application Data

[63] Continuation-in-part of Ser. No. 372,780, Jan. 13, 1995, Pat. No. 5,546,281.

[51] Int. Cl.⁶ .................................................. H05K 5/00
[52] U.S. Cl. .......................... 361/752; 361/753; 361/756; 439/76.1; 385/92
[58] Field of Search .................................. 361/796, 801, 361/802, 752–759; 385/88–89, 92, 94; 257/432, 433; 439/131, 153, 76.1, 74, 77, 946, 493, 465, 466, 469

[56] References Cited

U.S. PATENT DOCUMENTS

| | | | |
|---|---|---|---|
| 4,176,897 | 12/1979 | Cameron | 339/40 |
| 4,380,360 | 4/1983 | Parmer et al. | 339/17 |
| 4,388,671 | 6/1983 | Hall et al. | 361/383 |
| 4,486,059 | 12/1984 | Deyoung | 339/14 |
| 4,652,976 | 3/1987 | Fushimoto | 361/413 |
| 4,720,630 | 1/1988 | Takeuchi et al. | 250/227 |
| 4,798,430 | 1/1989 | Johnson et al. | 350/962 |
| 4,811,165 | 3/1989 | Currier et al. | 361/386 |
| 4,849,944 | 7/1989 | Matsushita | 371/21 |
| 5,013,247 | 5/1991 | Watson | 439/55 |
| 5,039,194 | 8/1991 | Block et al. | 385/88 |
| 5,202,943 | 4/1993 | Carden et al. | 385/92 |
| 5,345,530 | 9/1994 | Lebby et al. | 385/88 |

FOREIGN PATENT DOCUMENTS

| | | | |
|---|---|---|---|
| 228278 A | 8/1987 | European Pat. Off. | |
| 0 652 696 A1 | 11/1994 | European Pat. Off. | H05K 9/00 |
| 2 264843 | 9/1993 | United Kingdom | H04I 12/28 |

OTHER PUBLICATIONS

IBM Technical Disclosure Bulletin vol. 29 No. 10 Mar. 1987, p.4388 "Minimizing Electrostatic Discharge to a Cartridge".

*Primary Examiner*—Leo P. Picard
*Assistant Examiner*—Phuong T. Vu
*Attorney, Agent, or Firm*—David L. Newman

[57] ABSTRACT

A robust optoelectronic transceiver module which is quick, easy, and inexpensive to manufacture. The transceiver module has a main housing which consists of a potting box with potting material inserted therein. In addition, a circuit board is encased by the potting material. The circuit board has an optical subassembly mounted thereon. The optical subassembly extends outside of the potting box through a recess. Correspondingly, a recess cover is provided for forming a liquid tight seal between the recess cover, the potting box, and the optical subassembly.

12 Claims, 3 Drawing Sheets

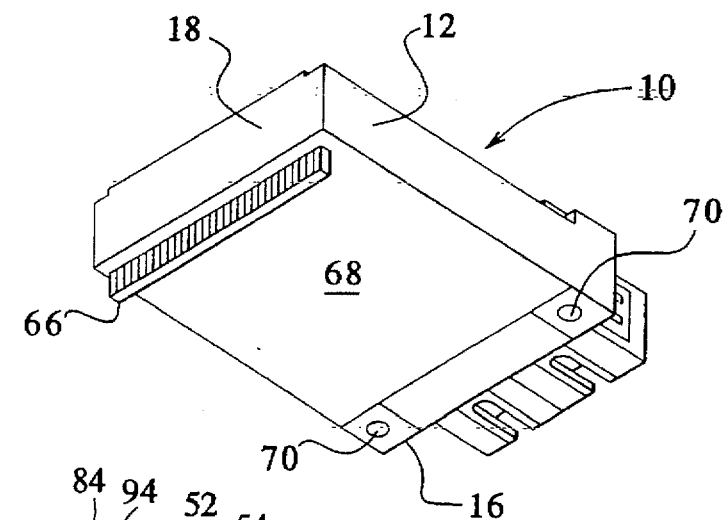
FIG.3
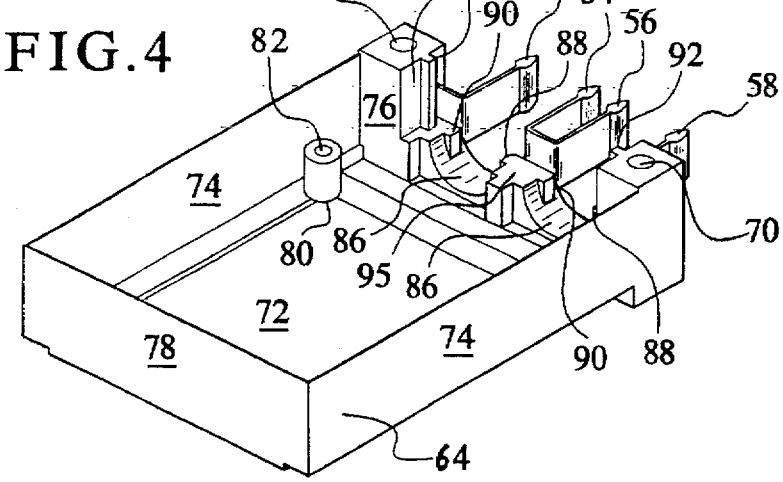
FIG.4
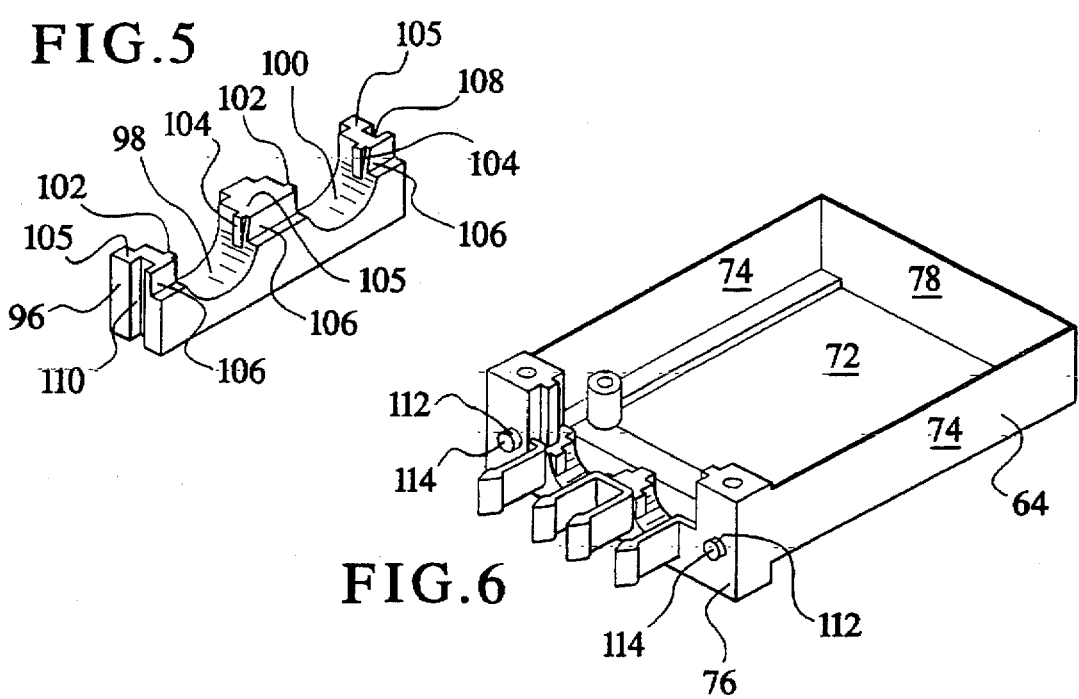
FIG.5
FIG.6

REMOVABLE OPTOELECTRONIC MODULE

This application is a continuation-in-part of U.S. Ser. No. 08/372,780, filed on Jan. 13, 1995, now U.S. Pat. No. 5,546,281, issued Aug. 19, 1996.

BACKGROUND OF THE INVENTION

This invention relates to generally to optoelectronic transceiver module and in particular, it relates to an optoelectronic transceiver module, and its method of manufacture, whereby the module is inexpensive to manufacture, has a small yet robust package, and can be installed and replaced via a ribbon style connector.

Optoelectronic transceiver modules provide for the bi-directional transmission of data between an electrical interface and an optical data link. The module receives electrically encoded data signals which are converted into optical signals and transmitted over the optical data link. Likewise, the module receives optically encoded data signals which are converted into electrical signals and transmitted onto the electrical interface.

Normally, the transceiver is mounted onto one of the circuit card assemblies of a host computer, input/output system, peripheral device, or switch. Therefore, as with all electronic equipment, there is a need for a transceiver having an outer package design which occupies as little circuit card surface area as possible.

In addition, there is a need for a transceiver module which is highly reliable and durable. One method presently used to ensure reliability and durability is to encapsulate the electronics of the transceiver within an insulative potting material. Encapsulating the transceiver electronics results in reducing vibration sensitivity and prevents unauthorized personnel from meddling with the module's electronics.

Presently, the molding of the potting material around the transceiver electronics is performed by placing the electronics within a silicone mold. Any portion of the electronics which extends outside of the mold is caulked, by hand, with a silicone compound which provides for a liquid tight seal. Once the mold is sealed, potting material is inserted therein. After the potting material is allowed to cure, the silicone mold is peeled away from the newly formed module.

The above described prior art molding process has several drawbacks. For example, it is time consuming and results in a transceiver module which has a pitted outer surface. In addition, the silicone mold used in the molding process has a limited life of only three to five modules before a new mold must be employed.

The optoelectronic module is provided with a plurality of electrical pins for forming an electrical connection with a circuit card assembly. The electrical pins consist of solid wire strands with each pin having one end connected to the electronics within the module and the other end protruding from the module's potting material.

The portion of each pin which protrudes from the potting material is either soldered within a plated through-hole, which is provided by the circuit card assembly, or placed within a connector which grasps onto the pin. However, the flimsy wire pins are very susceptible to deformation during both the normal handling of the module and its removal and installation onto a circuit card assembly. Thus, the flimsy pins currently used in the prior art are difficult and time consuming to attach to a circuit card assembly since they must be periodically inspected and realigned. Furthermore, the pins may break if they are realigned too many times.

In addition to the electrical pins, the module also is equipped with two mounting ports for physically securing the module onto the circuit card assembly. The module is placed onto the circuit card assembly so that the mounting ports align with holes provided in the circuit card assembly. Once the module is properly aligned, screws are inserted through the holes in the circuit card assembly and into the mounting ports of the module. The screws are then tightened until the module is firmly affixed to the circuit card assembly.

Similarly, to remove the module from the circuit card assembly, the screws must be removed and the wires either unsoldered from the circuit card or pulled from the connector which is a timely and expensive process requiring multiple components.

Therefore, there is a need for a transceiver module which provides for a small, yet robust package, which is inexpensive to manufacture and can easily and quickly be installed and removed from a circuit card assembly. The present invention is such an apparatus.

In view of the above, it is an object of the present invention to provide a small transceiver module package.

It is another object of the present invention to provide a module package that has a robust and tamper resistant design.

Also, it is an object of the present invention to provide a module which can quickly be installed and replaced from a circuit card assembly.

Another object of the present invention is to provide a module package design that can quickly and easily be produced.

A further object of the present invention is to provide a module package that can be produced inexpensively.

Furthermore, it is an object of the present invention to provide a module with a coating which dissipates an electrostatic discharge and serves as an electromagnetic shield.

SUMMARY OF THE INVENTION

In one form of the invention, a robust optoelectronic transceiver module is provided which is quick, easy, and inexpensive to manufacture. The transceiver module has a main housing which consists of a potting box with potting material inserted therein. In addition, a circuit board is encased by the potting material.

The invention further provides for an optical subassembly to be mounted on a circuit board. In addition, the potting box has a recess which allows the optical subassembly to extend outside of the potting box. Furthermore, a recess cover may be provided for forming a liquid tight seal between the recess cover, the potting box, and the optical subassembly.

The optoelectronic transceiver module may also have a ribbon style connector attached to the circuit board and protruding from the main housing. The ribbon style connector may protrude from either the bottom or one end of the main housing. In addition, the ribbon style connector may comprise of either a male ribbon style connector or a resilient male ribbon style connector.

In another form of the invention, an optoelectronic transceiver module is provided which mounts onto a circuit card assembly. The module has a main housing with a bottom. Protruding from the bottom of the main housing is a ribbon style connector which allows for quickly installing and replacing the module from the circuit card assembly.

In yet another form of the invention, a method of assembling an optoelectronic transceiver module is provided. The steps of the method consists of placing a circuit board within a potting box and injecting potting material within the potting box. In addition, the circuit board may be affixed within the potting box after the circuit board is positioned within the potting box. Furthermore, a liquid tight recess cover may be mounted within the potting box's recess after the circuit board is positioned within the potting box.

Also, the method of manufacture provides for coating the potting box with a conductive metal before the circuit board is placed within the potting box or after the potting material is injected within the potting box. Moreover, a connector shell may be mounted onto the potting box after the potting material is injected within the potting box.

In still another form of the invention, a method of assembling an optoelectronic transceiver is provided which includes the steps of affixing a circuit board within a housing and securing a conductive metal coating onto the housing.

In another form of the invention, a potting box is provided for potting optoelectronic components which include an optical subassembly. The potting box includes a wall having a recess which allows the optical subassembly to extend outside of the potting box. In addition, a recess cover is provided for forming a liquid tight seal between the recess cover, the potting box, and the optical subassembly. Furthermore, the invention provides for the potting box to have a standoff column for mounting a circuit board within the potting box and an alignment guide for engaging a groove within the recess cover.

Various means for practicing the invention and other advantages and novel features thereof will be apparent from the following detailed description of an illustrative preferred embodiment of the invention.

BRIEF DESCRIPTION OF THE DRAWINGS

There is shown in the drawings a preferred embodiment of the present invention, wherein like numerals in the various figures pertain to like elements, and wherein:

FIG. 3 is a bottom perspective view of the optoelectronic transceiver module depicted in FIG. 1;

FIG. 4 is an enlarged perspective view of the potting box used in the manufacture of the optoelectronic module depicted in FIGS. 1–3;

FIG. 5 is a perspective view of the recess cover used with the potting box of FIG. 4;

FIG. 6 is another enlarged perspective view of the potting box of FIG. 4;

DETAILED DESCRIPTION OF THE PRESENTLY PREFERRED EMBODIMENTS

Figure 1:
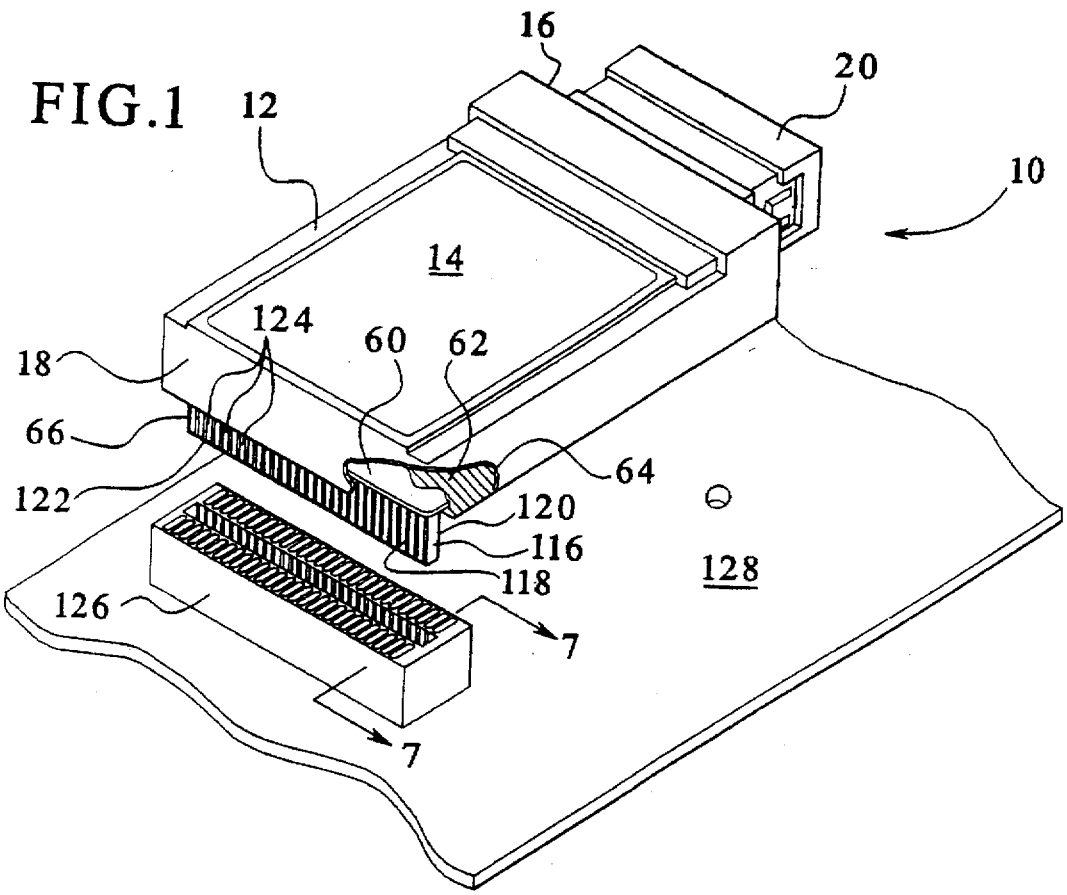
FIG. 1 is an enlarged perspective view of an optoelectronic transceiver module in accordance with the present invention and having a partial fragmentary view depicting the module's circuit board and potting material.

Referring to the drawing, and particularly to FIG. 1, an enlarged perspective view of an optoelectronic transceiver module 10 in accordance with the present invention is depicted. The module 10 has a main housing 12 which generally has the shape of an oblong box. The main housing 12 has a generally rectangular top 14 with a first end 16 and an opposite second end 18 extending perpendicularly from the top. Attached to the first end 16 of the main housing 12 is a transceiver connector 20 for receiving fiber optic plugs.

Figure 2:
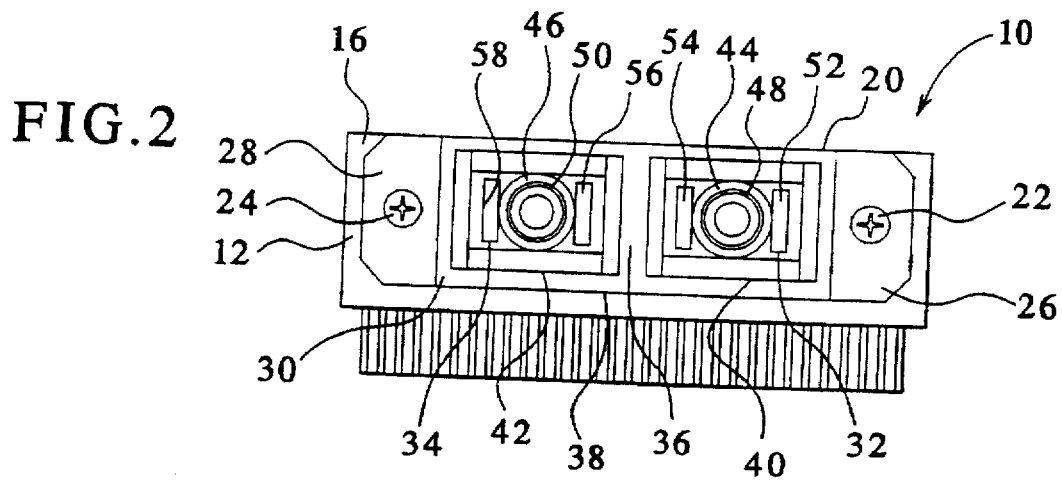
FIG. 2 is a front view of the optoelectronic transceiver module depicted in FIG. 1.

Turning to FIG. 2, a front view of the optoelectronic transceiver module 10 is depicted. The transceiver connector 20 is attached to the first end 16 of the main housing 12 by two screws 22,24. The two screws 22,24 extend through the transceiver connector's mounting ears 26,28 and into the main housing 12. Extending perpendicularly from the mounting ears 26,28 is a generally rectangularly shaped connector shell 30. The connector shell 30 provides two receptacles 32,34 for receiving fiber optic connector plugs. The receptacles 32,34 are formed by the connector shell 30 along with a divider wall 36 which extends along the center of the connector shell. Furthermore, located in the bottom 38 of each receptacle 32,34 is a keying channel 40,42 which extends toward the first end 16 of the main housing.

In the preferred embodiment, the receptacles 32,34 of the connector shell 30 are specifically dimensioned to receive an SC duplex plug. Therefore, the keying channels 40,42 ensure that an SC plug will be inserted so that receptacle 32 will only accept a plug for sending data and receptacle 34 will only accept a plug for receiving data.

Extending from the main housing 12 and into each of the receptacles 32,34 is an optical subassembly 44,46. As previously indicated, the optical subassembly 44 is for sending transmissions over a data link and the optical subassembly 46 is for receiving transmissions over a data link. In order to facilitate the connection between the transceiver 10 and the data links, each optical subassembly has a ferrule receiving portion 48,50. The ferrule receiving portion 48,50 couples with the SC plug. Furthermore, the transceiver's latch members 52,54,56, and 58 firmly hold the SC plug in contact with connector 20.

The actual sending and receiving of optically encoded data is performed by a laser diode within the optical subassembly 44 and a photo diode within the optical subassembly 46. Both the laser diode and the photo diode are electrically connected to a circuit board which is mounted within the main housing 12.

Turning back to FIG. 1, a portion of the circuit board 60 is depicted. Incorporated onto the circuit board 60 is circuitry for transmitting and receiving optically encoded data (circuitry not shown). The circuit board 60 is encased in potting material 62 and a potting box 64 which forms the main housing 12. The potting material 62 encases the circuit board 60 such that only the circuit board's male ribbon style connector 66 extends from the potting material 62.

Turning to FIG. 3, a perspective view of the bottom 68 of the transceiver module 10 is depicted. In the preferred embodiment, the bottom 68 has two mounting ports 70,70 which are adjacent to the first end 16 of the main housing 12. In addition, the male ribbon style connector 66 protrudes perpendicularly from the bottom 68 and is adjacent to the second end 18 of the main housing 12.

In an alternative embodiment, the ribbon style connector 66 may protrude perpendicularly from the second end 18 of the module 10 so that it can be connected to a circuit card assembly in a direction which is parallel to the direction of insertion of the optic plugs into the module's receptacles. However, in this alternative embodiment, another recess cover will be needed in order to prevent potting material from escaping the second end of the potting box.

Referring to FIG. 4, an enlarged perspective view of the optoelectronic module's potting box 64 is depicted. The potting box 64 forms the outer housing of the optoelectronic module.

Thus, the potting box generally has the shape of an oblong box with a rectangular bottom 72, two parallel side walls 74,74, a first end wall 76, and an opposite second end wall 78. In a preferred embodiment, the potting box 64 is injection molded of a polymer material such as VALOX, STANYL, or any other glass-filled heat resistant material which can withstand solder reflow temperatures. The use of such a potting box eliminates the need for a silicone mold required by prior art modules. In addition, it is preferred that the potting box 64 be either plated, wet plated, or vacuum metalizied with an aluminum or stainless steel coating in order to dissipate an electrostatic discharge and provide for electromagnetic shielding. As well, the transceiver connector 20 (FIG. 1) may be plated, wet plated, or vacuum metalized, in order to reduce emissions and enhance grounding of the module. Such metalization of the connector 20 can bring the module in compliance with FCC Rules, Part 15. In a preferred embodiment, the connector 20 is metalized separately from the potting box 64 so that each attachment portion is metalized and provides for conductivity between the parts. As the connector 20 will be attached to a chassis containing fiber optic connectors which are at ground potential, the connector will ground the metalized potting box 64 which is attached to a daughter board. Such grounding enhances the module's ability to dissipate electrostatic discharge and provide for electromagnetic shielding. The transceiver connector 20 also includes a grounding clip 25 attached at the slot 23.

As previously indicated, all of the transceiver's latch members 52, 54, 56, and 58 extend from the first wall 76 of the potting box 64. Also, the first end wall 76 of the potting box furnishes the mounting ports 70,70 which are located on the bottom of the main housing. In a preferred embodiment, the latch members 52, 54, 56 and 58 are integrally molded with the potting box 64.

Circuit board standoff columns 80 are also provided by the potting box 64 (only one standoff column is depicted in FIG. 4). Each standoff column protrudes from the bottom 72 of the potting box 64 and is positioned next to the first end wall 76 and one of the side walls 74,74 for supporting the circuit board 60. The standoff columns 80 have a length equal to approximately half the depth of the potting box 64 with the distal end of the column having a circuit board mounting port 82.

As depicted in FIG. 4, the first wall 76 of the potting box 64 has a recess 84 for allowing the placement of the circuit board's optical subassemblies. The recess 84 has two semi-circular through-ports 86,86. Within each through-port 86,86 are two guide beams 88,90 which are positioned on each end of the through-port's semicircle for positioning the optical subassemblies 44,46.

Also located on the first wall 74 are two recess cover alignment guide beams 92,94. The alignment guide beams 92,94 boarder each side of the recess 84 and extend along the entire depth of the recess. The bottom of the recess 84 has three flat mating surfaces 95 (only two of the mating surfaces are depicted in FIG. 4).

Correspondingly, referring to FIG. 5, a recess cover 96 is depicted for placement within the recess located in the first wall of the potting box. Preferably, the recess cover 96 is made of the same material as the potting box and is either plated, wet plated, or vacuum metalizied with an aluminum or stainless steel coating.

In FIG. 5, the recess cover 96 has two semicircular through-ports 98,100. Within each of the through-ports 98,100 are two guide beams 102,104 positioned on each end of the through-port's semicircle. Also, the top of the recess cover includes three flat mating surfaces 105.

The recess cover 96 firmly mounts within the recess of the potting box's first wall so that the mating surfaces 95 and 105 of both the recess 84 and the recess cover 96 will abut each other. The recess cover 96 includes three indentions 106 which allow the cover to be positioned around the location where the latch members 52, 54, 56, and 58 attach to the potting box. In addition, on each end of the recess cover 96 there are alignment grooves 108, 110 which provide for sliding engagement with the alignment guide beams 92,94 bordering the recess within the potting box's first wall.

Referring back to FIG. 4, during the manufacture of the transceiver module the circuit board is placed in the potting box 64 with the male ribbon connector protruding outside of the potting box and the circuit board's optical subassemblies protruding out of the recess 84 in the first wall 76. The optical subassemblies 44,46 are properly positioned within the potting box 64 by the alignment guides 88,90 located within each through-port 86,86.

Once positioned within the potting box 64, the circuit board 60 is affixed by two screws which are mounted to the standoff columns 80 via the circuit board mounting ports 82.

Once the circuit board 60 is secured within the potting box 64, the recess cover 96 is mounted onto the first end wall 76. The recess cover 96 is mounted by engaging its alignment grooves 108,110 with the potting box's recess cover alignment guide beams 92,94. When the recess cover 96 is slid into position, the cover's through-ports 98,100 and associated alignment guide beams 102,104 will adjoin the circuit board's optical subassemblies 44,46. Furthermore, due to the tight tolerances of both the potting box 64 and the recess cover 96, a liquid tight seal will be formed between the potting box 64, the recess cover 96, and the optical subassemblies 44,46. Thus, with the recess cover 96 in place, potting material is injected within the potting box 64 for encasing the circuit board 60. The time to mold the module by the above method is reduced by approximately 90% over the prior art molding process because no hand caulking is needed to form the liquid tight seal.

Finally, referring to FIG. 6, the connector shell 20 (See FIGS. 1 & 2) is mounted onto the first end wall 76 of the potting box 64 after the potting material has cured. Alignment of the connector shell 20 is provided by two mounting posts 112,112. Each mounting post 112 has a bore 114 which facilitates the attachment of the connector shell 20, by the use of the previously mentioned screws, onto the potting box 64.

In an alternative embodiment, the ribbon style connector 66 may protrude perpendicularly from the second end 18 of the module 10 so that it can be connected to a circuit card assembly in a direction which is parallel to the direction of insertion of the optic plugs into the module's receptacles. However, in this alternative embodiment, another recess cover will be needed in order to prevent potting material from escaping the second end of the potting box.

Referring back to FIG. 1, the male ribbon style connector 66 protruding from the module 10 has a beam portion 116, made of insulative material, which extends perpendicularly across the length of the circuit board 60. The male ribbon style connector 66 also has a first side 118, an opposite second side 120, and a distal end 122. Extending perpendicularly from the circuit board 60 on both the first side 118 and the second side 120 of the male ribbon style connector 66 are twenty-eight electrical contacts 124. Each electrical contact 124 consists of a strip of conductive material which is affixed to the male ribbon style connector 66 and is electrically connected to the circuitry mounted on the circuit board 60.

Figure 7:
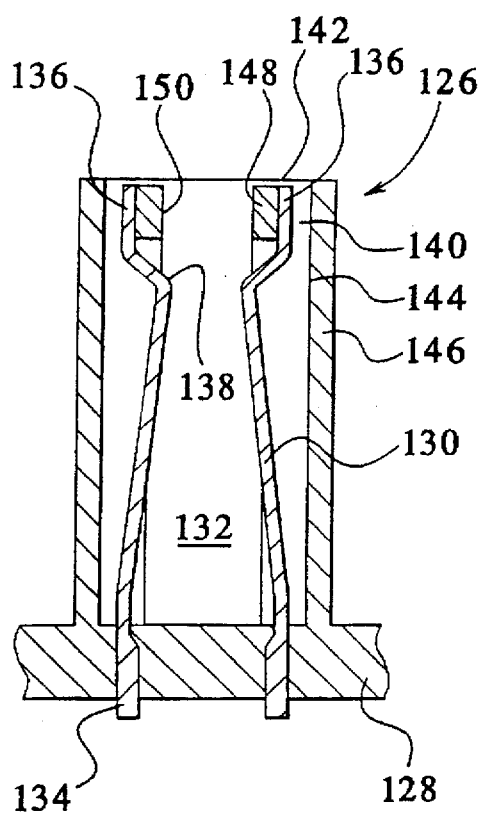
FIG. 7 is an enlarged cut-away side view of the female ribbon style connector taken along line 7—7 of FIG. 1.

Correspondingly, the male ribbon style connector 66 couples to a female ribbon style connector 126 which is mounted onto the circuit card assembly 128. Referring to FIG. 7, an enlarged cut-away side view is shown of the female ribbon style connector 126 taken along line 7—7 of FIG. 1. The female ribbon style connector 126 has two parallel rows of twenty-eight (28) contact beams 130,130 contained within a contact chamber 132 (only one contact from each row is depicted). Each contact beam 130 is constructed of a flat strip of conductive metallic material. Furthermore, each contact beam 130 has a first end 134, a second distal end 136, and a bend 138 which is located adjacent to the second end and extends toward the contact beam located in the opposite row.

The female ribbon style connector 126 is mounted onto the circuit card 128 such that the first end 134 of each contact beam 130 extends through the circuit card assembly. Likewise, the second end 136 of each contact beam 130 extends within a travel limitation slot 140 formed in the top 142 of the female ribbon style connector 126. Each slot 140 provides a backstop 144, consisting of one of the connector's walls 146, and a frontstop 148. Correspondingly, contact beams 130,130 are positioned in the chamber 132 such that the second end 136 of each contact beam 130 resiliently urges against the frontstop 148.

In order to provide access to the contact beams 130,130 within the female ribbon style connector 126, the top 142 of the connector has a slot 150 positioned between the two rows of contact beams. Correspondingly, in order to make an electrical connection between the female ribbon style connector 126 and the male ribbon style connector 166 depicted in FIG. 1, the distal end 122 of the male ribbon style connector is inserted within the female connector's slot 150. As the male ribbon style connector 66 is pushed further within the female connector's chamber 132 the two rows of contact beams 130,130 will be forced to sperate further from each other. In addition, each contact beam 130 will resiliently urge against a corresponding electrical contact 124 mounted on the male ribbon style connector 66. Thus, an electrical connection will be formed between the male ribbon style connector's electrical contacts 124,124 and the female connector's contact beams 130,130.

Similarly, to disconnect the male ribbon style connector's electrical contacts 124,124 from the female connector's contact beams 130,130 the male connector 66 is simply pulled from the chamber 132 of the female connector. Once the male ribbon style connector 66 has been removed from the chamber 132, the contact beams 130 of the female connector 126 will resiliently regain the configuration of FIG. 7, whereby the second end 136 of each contact beam will abut its corresponding frontstop 148.

Figure 8:
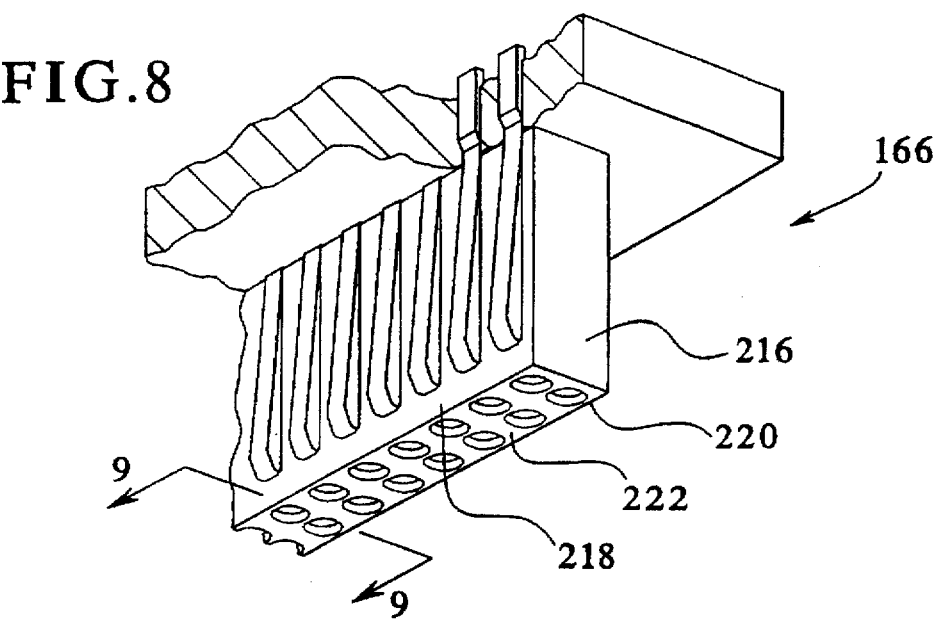
FIG. 8 is an enlarged perspective view, along with a partial fragmentary view, of a resilient male ribbon style connector for use with the optoelectronic transceiver module of FIGS. 1–3.
Figure 1:
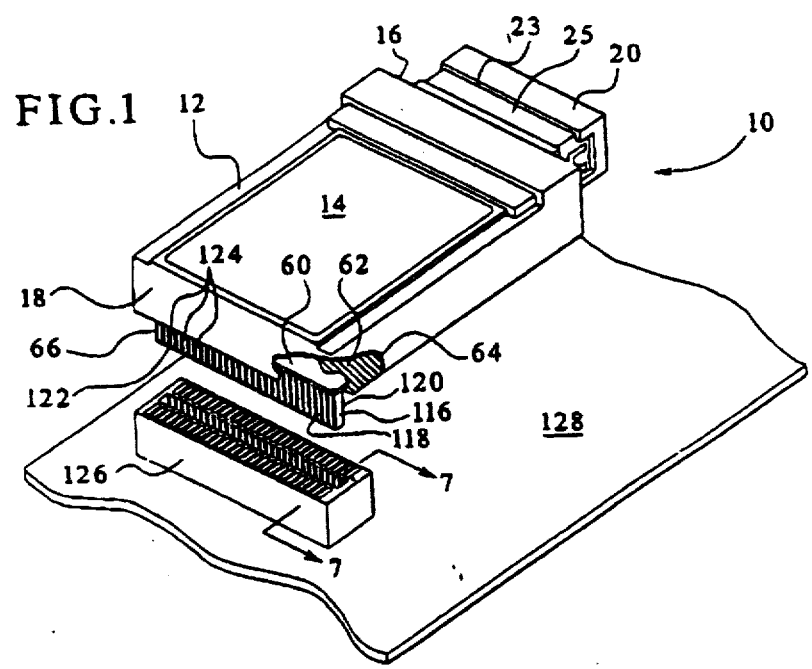
Figure 2:
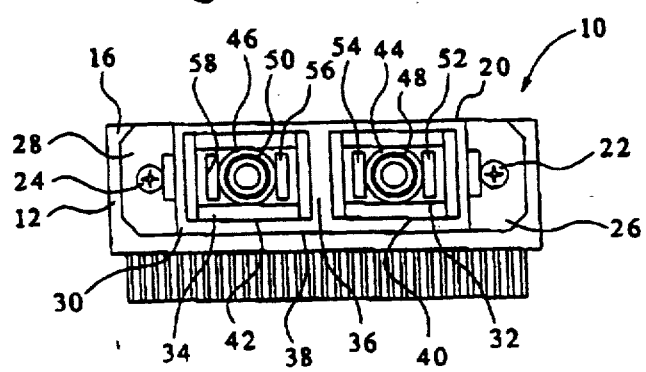

Turning to FIG. 8, an enlarged perspective view, along with a partial fragmentary view, is depicted of a resilient male ribbon style connector 166. The connector 166 includes a beam type housing 216 having a first side 218, an opposite second side 220, and a distal end 222. The resilient male ribbon style connector 166 in FIG. 8 serves as another embodiment of the male ribbon style connector depicted in FIGS. 1–3 wherein the male connector in FIG. 8 is resilient and the male connector in FIGS. 1–3 is non-resilient. It should be noted, however, that other means for quickly installing and replacing the module from a circuit card assembly may be used.

Figure 9:
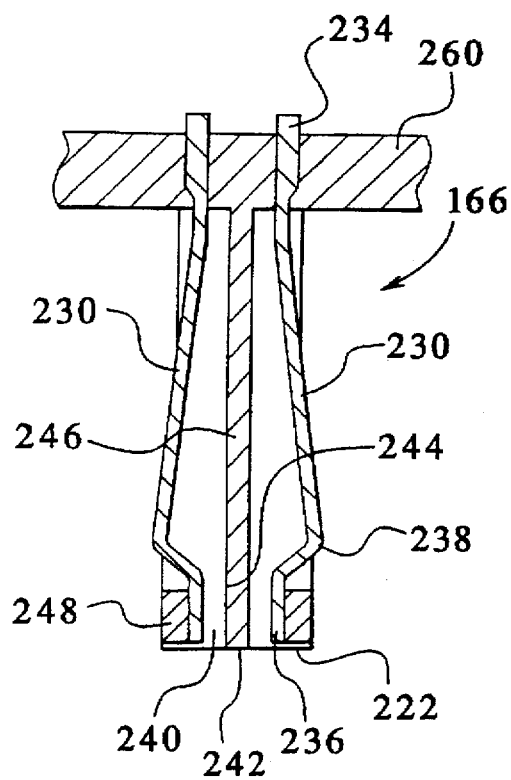
FIG. 9 is a cut-away side view of the resilient male ribbon style connector taken along line 9—9 of FIG. 8.

Referring to FIG. 9, an enlarged cut-away side view of the resilient male ribbon style connector 166 is shown taken along line 9—9 of FIG. 8. The male ribbon style connector 166 has two parallel rows of twenty-eight (28) contact beams 230,230 (only one contact from each row is depicted). Each contact beam 230 is constructed of a flat strip of conductive metallic material. Furthermore, each contact beam 230 has a first end 234, a second distal end 236, and a bend 238 which is located adjacent to the second end and extends away from the contact beam located in the opposite row.

The male ribbon style connector 166 is mounted onto the module's circuit board 260 such that the first end 234 of each contact beam 230 extends through the circuit board. In a preferred embodiment, the first end 234 of the contact 230 is inserted within a through-hole of the circuit board 260 which contains traces for providing an electrical connection from the contact 260 to components mounted on the board. Likewise, the second end 236 of each contact beam 230 extends within a travel limitation slot 240 formed in the top 242 of the resilient male ribbon style connector 166. Each slot 240 provides a backstop 244, consisting of the connector's support wall 246, and a frontstop 248. Corresponding, contact beams 230,230 are positioned such that the second end 236 of each contact beam 230 resiliently urges against the frontstop 248.

Access for making an electrical connection with the contact beams 230,230 is provided since they protrude from the male ribbon style connector 166 in the area around the bends 238,238. Correspondingly, in order to make an electrical connection between a female ribbon style connector and the resilient male ribbon style connector 166, the distal end 222 of the male ribbon style connector is inserted within a slot provided by the female connector. As the male ribbon style connector 166 is pushed within the female connector, the two rows of contact beams 230,230 will be forced to compress towards each other. In addition, each contact beam 230 will resiliently urge against a corresponding electrical contact mounted within the female ribbon style connector. Thus, an electrical connection will be formed between the male ribbon style connector's electrical contact beams 230, 230 and the female connector's contact beams.

Similarly, to disconnect the resilient male ribbon style connector 166 from the female connector, the male connector is simply pulled from the female connector. Once the male ribbon style connector 166 has been removed, the contact beams 230,230 will resiliently regain the configuration of FIG. 9, whereby the second end 236 of each contact beam will abut its corresponding frontstop 248.

It should be understood that in describing the top and bottom portions of the transceiver module and its respective potting box components, the terms "top" and "bottom" are used by way of example only due to the orientation of the drawings. It should also be understood that various changes and modifications to the presently preferred embodiments described herein will be apparent to those skilled in the art. Furthermore, although the transceiver module depicted in the presently preferred embodiment has its male ribbon style connector extending from the bottom, it should be understood from the outset that the connector can be configured to extend, for example, from the second end of the transceiver. Therefore, changes and modifications may be made without departing from the spirit and scope of the present invention and without diminishing its attendant advantages. Thus, it is intended that such changes and modifications be covered by the appended claims.

We claim:

1. An optoelectronic module comprising:
   a housing including a first end wall having a through port and adjacent the through port a metallized transceiver connector;
   a circuit board mounted within said housing and an optical subassembly electrically connected to said circuit board and adjacent said through port; and
   an electrical connector at a second end of said housing connected to said circuit board and protruding from said housing for quickly installing and replacing said module to or from a circuit card assembly and the electrical connector including at least a pair of metallic fingers extending from said housing.

2. The optoelectronic module of claim 1 wherein the metallic fingers are separated by an insulator.

3. The optoelectronic module of claim 1 wherein the electrical connector includes a beam of insulative material having electrical contacts.

4. The optoelectronic module of claim 1 wherein the electrical connector protrudes perpendicularly from the second end parallel to the circuit board.

5. The optoelectronic module of claim 1 wherein said electrical connector is a male ribbon-style connector.

6. The optoelectronic module of claim 1 wherein said housing includes a mounting member for facilitating the insertion and removal of said module to and from a circuit card assembly.

7. The optoelectronic module of claim 1 wherein the housing forms a potting box for the potting of the optical subassembly.

8. The optoelectronic module of claim 1 wherein the transceiver connector includes a grounding clip attached to a slot on the transceiver connector.

9. The optoelectronic module of claim 1 wherein the housing is metallized in order to provide for the grounding of the housing and provide for the dissipation of electrostatic discharge and provide for electromagnetic shielding.

10. The optoelectronic module of claim 9 wherein the housing is metallized separately from the metallization of the transceiver connector.

11. The optoelectronic module of claim 1 wherein the electrical connector at the second end connects to a receptacle mounted on a daughter board within the chasis of an electronic apparatus.

12. The optoelectronic module of claim 11 wherein the optoelectronic module achieves a ground potential equal to that of the electronic apparatus.

* * * * *

UNITED STATES PATENT AND TRADEMARK OFFICE
CERTIFICATE OF CORRECTION

PATENT NO. : 5,717,533  Page 1 of 4
DATED : February 10, 1998
INVENTOR(S) : Daniel S. Poplawski, et al.

It is certified that error appears in the above-identified patent and that said Letters Patent is hereby corrected as shown below:

The title page, should be deleted to appear as per attached title page.
The sheets of drawings, consisting of figures 1 and 2 should be deleted to appear as per attached figures 1 and 2.

Claim 11, column 10, line 22, "chasis" should read --chassis--

Column 1, line 9, "to" should be deleted

Signed and Sealed this

Twenty-third Day of June, 1998

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,717,533
DATED : February 10, 1998
INVENTOR(S) : Daniel S. Poplawski, et al It is certified that error appears in the above-identified patent and that said Letters Patent is hereby corrected as shown below:

ON THE COVER PAGE:

Under "References cited" please add to the list of U. S. Patent Documents the following:

| | |
|---|---|
| 4,176,897, Cameron | 4,380,360, Parmer, et al |
| 4,388,671, Hall, et al | 4,486,059, DeYoung |
| 4,652,976, Fushimoto | 4,720,630, Takeuchi, et al |
| 4,798,430, Johnson, et al | 4,811,165, Currier, et al |
| 4,849,944, Matsushita | 5,013,247, Watson |
| 5,039,194, Block, et al | 5,086,422, Hagiya, et al |
| 5,104,243, Harding | 5,107,404, Tam |
| 5,108,294, Marsh, et al | 5,117,476, Yingst, et al |
| 5,202,943, Carden, et al | 5,305,182, Chen |
| 5,329,428, Block, et al | 5,337,391, Lebby |
| 5,337, 398, Benzoni, et al | 5,345,530, Lebby, et al |
| 5,357,402, Anhalt | 5,416,871, Takahashi, et al |
| 5,596,663, Ishibashi, et al | |

Please omit "to" (first occurrence) at Column 1, Line 9.

United States Patent [19]

Poplawski et al.

[11] Patent Number: 5,717,533
[45] Date of Patent: *Feb. 10, 1998

[54] REMOVABLE OPTOELECTRONIC MODULE

[75] Inventors: Daniel S. Poplawski, Montgomery; James W. McGinley, Schaumburg, both of Ill.

[73] Assignee: Methode Electronics Inc., Chicago, Ill.

[*] Notice: The term of this patent shall not extend beyond the expiration date of Pat. No. 5,546,281.

[21] Appl. No.: 417,914

[22] Filed: Apr. 6, 1995

Related U.S. Application Data

[63] Continuation-in-part of Ser. No. 372,780, Jan. 13, 1995, Pat. No. 5,546,281.

[51] Int. Cl.⁶ .................................... H05K 5/00
[52] U.S. Cl. .................... 361/752; 361/753; 361/756; 439/76.1; 385/92
[58] Field of Search .................. 361/796, 801, 361/802, 752–759; 385/88–89, 92, 94; 257/432, 433; 439/131, 153, 76.1, 74, 77, 946, 493, 465, 466, 469

[56] References Cited

U.S. PATENT DOCUMENTS

| 4,176,897 | 12/1979 | Cameron | 339/40 |
|---|---|---|---|
| 4,380,360 | 4/1983 | Palmer et al. | 339/17 |
| 4,388,671 | 6/1983 | Hall et al. | 361/383 |
| 4,486,059 | 12/1984 | Deyoung | 339/14 |
| 4,632,976 | 3/1987 | Pushimoto | 361/413 |
| 4,720,630 | 1/1988 | Takeuchi et al. | 250/227 |
| 4,798,430 | 1/1989 | Johnson et al. | 350/962 |
| 4,811,165 | 3/1989 | Currier et al. | 361/386 |
| 4,849,944 | 7/1989 | Matsushita | 371/21 |
| 5,013,247 | 5/1991 | Watson | 439/55 |
| 5,039,194 | 8/1991 | Block et al. | 385/88 |
| 5,202,943 | 4/1993 | Carden et al. | 385/92 |
| 5,345,530 | 9/1994 | Lebby et al. | 385/88 |

FOREIGN PATENT DOCUMENTS

| 228278 A | 8/1987 | European Pat. Off. | |
| 0 652 696 A1 | 11/1994 | European Pat. Off. | H05K 9/00 |
| 2 264843 | 9/1993 | United Kingdom | H04I 12/28 |

OTHER PUBLICATIONS

IBM Technical Disclosure Bulletin vol. 29 No. 10 Mar. 1987, p.4388 "Minimizing Electrostatic Discharge to a Cartridge".

Primary Examiner—Leo P. Picard
Assistant Examiner—Phuong T. Vu
Attorney, Agent, or Firm—David L. Newman

[57] ABSTRACT

A robust optoelectronic transceiver module which is quick, easy, and inexpensive to manufacture. The transceiver module has a main housing which consists of a potting box with potting material inserted therein. In addition, a circuit board is encased by the potting material. The circuit board has an optical subassembly mounted thereon. The optical subassembly extends outside of the potting box through a recess. Correspondingly, a recess cover is provided for forming a liquid tight seal between the recess cover, the potting box, and the optical subassembly.

12 Claims, 3 Drawing Sheets

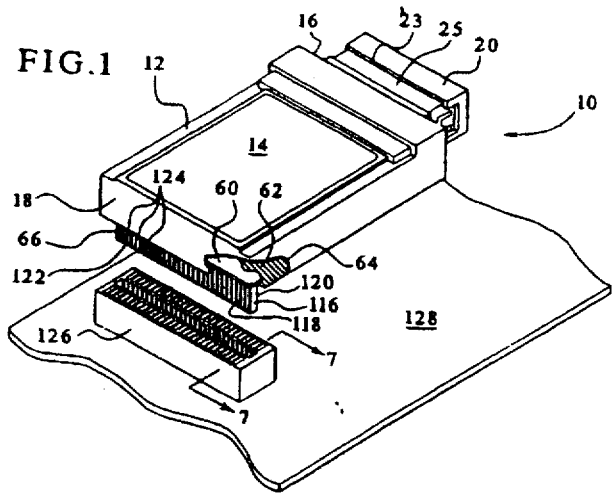

FIG.1